(12) United States Patent
Hernandez et al.

(10) Patent No.: US 8,635,689 B2
(45) Date of Patent: Jan. 21, 2014

(54) HYBRID ROLE MINING

(75) Inventors: Milton H. Hernandez, Tenafly, NJ (US); Jim A. Laredo, Katonah, NY (US); Supreet R. Mandala, State College, PA (US); Yaoping Ruan, White Plains, NY (US); Vugranam C. Sreedhar, Yorktown Heights, NY (US); Maja Vukovic, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 132 days.

(21) Appl. No.: 13/283,371

(22) Filed: Oct. 27, 2011

(65) Prior Publication Data

US 2013/0111583 A1 May 2, 2013

(51) Int. Cl.
*H04L 29/06* (2006.01)
*G06F 21/00* (2013.01)

(52) U.S. Cl.
USPC .............. 726/21; 726/1; 726/2; 726/3; 726/4; 726/16; 726/17; 726/26; 726/27; 726/28; 726/29; 726/30; 713/164; 713/165; 713/166; 713/167; 713/182; 713/183; 713/184; 713/185; 713/186; 705/7.11; 705/7.12; 705/7.13; 705/7.15; 705/7.21; 705/7.22; 705/7.25; 705/7.26

(58) Field of Classification Search
USPC ........................... 726/1–4, 16–17, 21, 26–30; 713/164–167, 182–186; 709/217–229; 705/7.11–7.26
See application file for complete search history.

(56) References Cited

U.S. PATENT DOCUMENTS 7,219,234 B1  5/2007 Ashland et al.
8,209,742 B2 * 6/2012 Schreiber et al. .............. 726/2
2002/0144142 A1 10/2002 Shohat
2005/0138419 A1 6/2005 Gupta et al.
2006/0200771 A1 * 9/2006 Nielsen et al. ................ 715/738
2009/0144803 A1 6/2009 Schreiber et al.
2009/0217371 A1 8/2009 Desai et al.
2010/0005518 A1 1/2010 Tirpak et al.

OTHER PUBLICATIONS

Mining Roles with Noisy Data by Molloy et al; Publisher: ACM; Date: Jun. 2010.*
Observations on the Role Life-Cycle in the Context of Enterprise Security Management by Kern et al; Publisher: ACM; Year: 2002.*
On the Definition of Role Mining by Frank et al; Publisher: ACM; Date: Jun. 2010.*
Role Mining Based on Weights by Ma et al; Publisher: ACM; Date: Jun. 2010.*

(Continued)

*Primary Examiner* — Madhuri Herzog
(74) *Attorney, Agent, or Firm* — Yee & Associates, P.C.; Louis J. Percello

(57) ABSTRACT

An embodiment of the invention is directed to a data processing system having a plurality of users, a portion of which were previously assigned permissions respectively corresponding to system resources. The embodiment includes acquiring data from a first data source, containing information pertaining to the portion of users and their permissions, and further includes acquiring data from a second data source, containing information pertaining to attributes of each user of the plurality. A set of permissions is determined for a given role, from both first and second data sources. First and second criteria are determined for assigning users to the given role, from information in the first and second data sources, respectively. A particular user is selected for admission to the given role only if the particular user is in compliance with both the first criterion and second criterion.

20 Claims, 9 Drawing Sheets

(56) References Cited

OTHER PUBLICATIONS

A new role mining framework to elicit business roles and to mitigate enterprise risk by Colantonio et al; Publisher: Elsevier; Date: Aug. 19, 2010.*

Frank et al., "A probabilistic approach to hybrid role mining", in: CCS '09, New York, NY, USA, ACM Press 2009, pp. 101-111.

Colantonio et al., "A formal framework to elicit roles with business meaning in RBAC systems", In: SACMAT '09, 2009.

Molloy et al., "Mining roles with semantic meanings", In: SACMAT '08, New York, NY, USA, ACM Press 2008, pp. 21-30.

Vaidya et al., "The role mining problem: finding a minimal descriptive set of roles", In: SACMAT '07, New York, NY, USA, ACM Press 2007, pp. 175-184.

Zhang et al., "Role engineering using graph optimisation", In: SACMAT '07, New York, NY, USA, ACM Press 2007, pp. 139-144.

Ene et al., "Fast exact and heuristic methods for role minimization problems", In: SACMAT '08, New York, NY, USA, ACM Press 2008, pp. 1-10.

Schlegelmilch et al., "Role mining with ORCA", In: SACMAT '05, New York, NY, USA, ACM Press 2005, pp. 168-176.

* cited by examiner

HYBRID ROLE MINING

BACKGROUND OF THE INVENTION

1. Field of the Invention

The invention disclosed and claimed herein generally pertains to a system and method for determining or generating one or more roles, for use in a data processing system that employs role based access control (RBAC) for security. More particularly, the invention pertains to a system and method of the above type, wherein roles are determined by mining different types of information resources.

2. Description of the Related Art

In a computer or data processing system, RBAC is commonly used to enhance security by specifying the extent to which different users are authorized to access the system. In a business or other organization, RBAC provides a number of roles, wherein each role typically corresponds to a function of the organization. Each of the roles has a set of users who perform the function, and also has a set of permissions that are needed for function performance. As is known by those of skill in the art, and as also used herein, the term "permission" is defined to mean approval of a mode of access to a specified system resource, wherein the approval is granted to a system user. Each user admitted to a particular role is granted each of the permissions in the permission set of such role. Thus, RBAC can provide an orderly mechanism for assigning and regulating access of respective users to the various system resources.

In order to define or determine roles of the above type for an organization, a previously used approach has been to obtain various types of information about the organization. Such information could include, by way of example, organizational structure, processes used, security policies, and user skills and attributes. Typically, this information has been obtained from users and other human sources by means of interviews, questionnaires and the like. Accordingly, this approach or method for determining roles has been referred to as a "top down" approach. However, because it is human intensive, this approach tends to be very costly and time consuming.

As an alternative to the top down approach, use has been made of the Access Control List (ACL) of the computer or data processing system of an organization, wherein the ACL is a table listing each of the system users and their respective permissions. This alternative, referred to as a "bottom up" approach, assumes that certain patterns exist in the particular permissions which are assigned to different users. Accordingly, reasonable user-permission roles within an organization may be determined or discovered by processing user-permission data furnished by the corresponding ACL of the organization. However, in order to use this approach efficiently, particularly in connection with a large organization, role mining must be applied to the ACL data. At present, there is a significant lack of semantics in the mined roles. More particularly, the mined roles need not correspond to functions of the organization, and therefore are not practically useful. This is largely because previous efforts have assumed that a role configuration with a minimal number of roles (or user-role assignments/role-permission assignments) is semantically meaningful. However, this assumption is questionable. Accordingly, an alternative technique for role mining is required which can output a set of practically relevant roles, which are meaningful for businesses and other organizations.

SUMMARY

Embodiments of the invention provide a system and method that can determine one or more roles for a data processing system, by combining data that has been mined or obtained from different sources. One embodiment comprising a method is directed to a data processing system associated with a plurality of users, wherein at least a portion of the users have each been previously assigned one or more permissions which correspond respectively to specified system resources. The method includes the step of acquiring data from a first data source, wherein the first data source contains information pertaining to both the users of the portion and to the permissions previously assigned thereto. The method further includes acquiring data from a second data source, wherein the second data source contains information pertaining to one or more specified attributes of each user of the plurality of users. A set of permissions are determined for a given role, wherein the set of permissions are determined using information from at least one of the first data source and the second data source, and the set of permissions comprises one or more specified permissions associated with resources of the system, and tasks for which users require such permissions. The method further includes determining a first criterion and a second criterion for assigning users to the given role, from information contained in the first and second data sources, respectively. A particular user is selected for admission to the given role only if the particular user is in compliance with both the first criterion and the second criterion, wherein each user admitted to the given role is assigned each of the specified permissions of the permission set.

DETAILED DESCRIPTION

Figure 1:
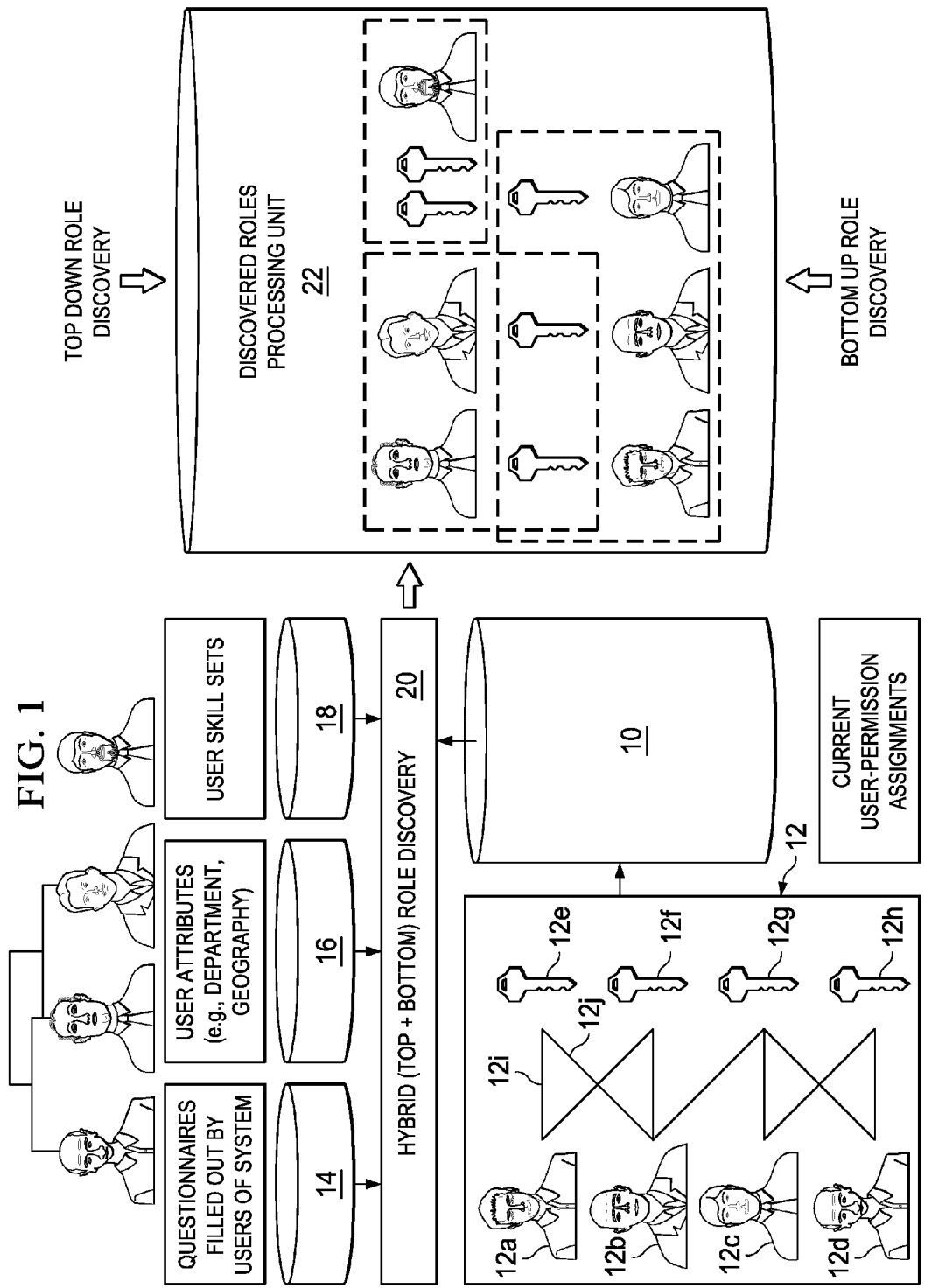
FIG. 1 is a schematic diagram showing elements of an embodiment of the invention.

As will be appreciated by one skilled in the art, aspects of the illustrative embodiments may be embodied as a system, method or computer program product. Accordingly, aspects of the illustrative embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the illustrative embodiments may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the illustrative embodiments may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the illustrative embodiments are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Referring to FIG. 1, there is shown a hybrid approach, in accordance with an embodiment of the invention, for determining or discovering roles for a data processing system that uses RBAC. More particularly, FIG. 1, illustrates acquisition of information of different types from two different sources, which respectively comprise the bottom up and top down sources referred to above. All the acquired information is to be processed together, in order to provide one or more useful roles for the system.

As described above, the bottom up approach assumes that a number of users were previously assigned various permissions, so that there is a current group of user-permission assignments. This information is contained in the system ACL, or in corresponding system logs. In FIG. 1, all such information pertaining to current user-permission assignments is stored in a data source or database 10. Database 10 may include a device that monitors user login data, and validates respective user-permission assignments.

In order to graphically illustrate a group of user-permission assignments and their relationships to one another, FIG. 1 depicts a diagram or graph 12 which includes users 12*a-d* and permissions 12*e-h*. Each user-permission pair is connected by a line or edge, such as edges 12*i* and 12*j*, which extends between the user and permission of a given pair.

Referring further to FIG. 1, there are shown databases 14, 16, and 18 which respectively pertain to the top down approach. Thus, databases 14-18 contain information about system users, and more specifically about the attributes, characteristics and skills of each user of the system associated with FIG. 1. Such information could include, by way of example, the functions, positions and departments of users in their respective organizations, and could further include user skill sets and their geographic locations. Such information may be obtained by extensive human interaction, such as by questionnaires prepared by users or their managers.

FIG. 1 further shows that the bottom up database 10 and the top down databases 14-18 are each connected to a common channel 20, and routed thereby to a processing unit 22 or the like. Processing unit 22 is operable to determine or discover roles for use in an RBAC structure. Each of such roles must have a set of permissions, wherein the permission set comprises one or more permissions to access system resources as described above. Each role must further have one or more associated criteria, wherein the user must meet or comply with all such criteria in order to be admitted to the role. Each user admitted to the role is assigned each permission that is included in the role permission set.

Figure 2:
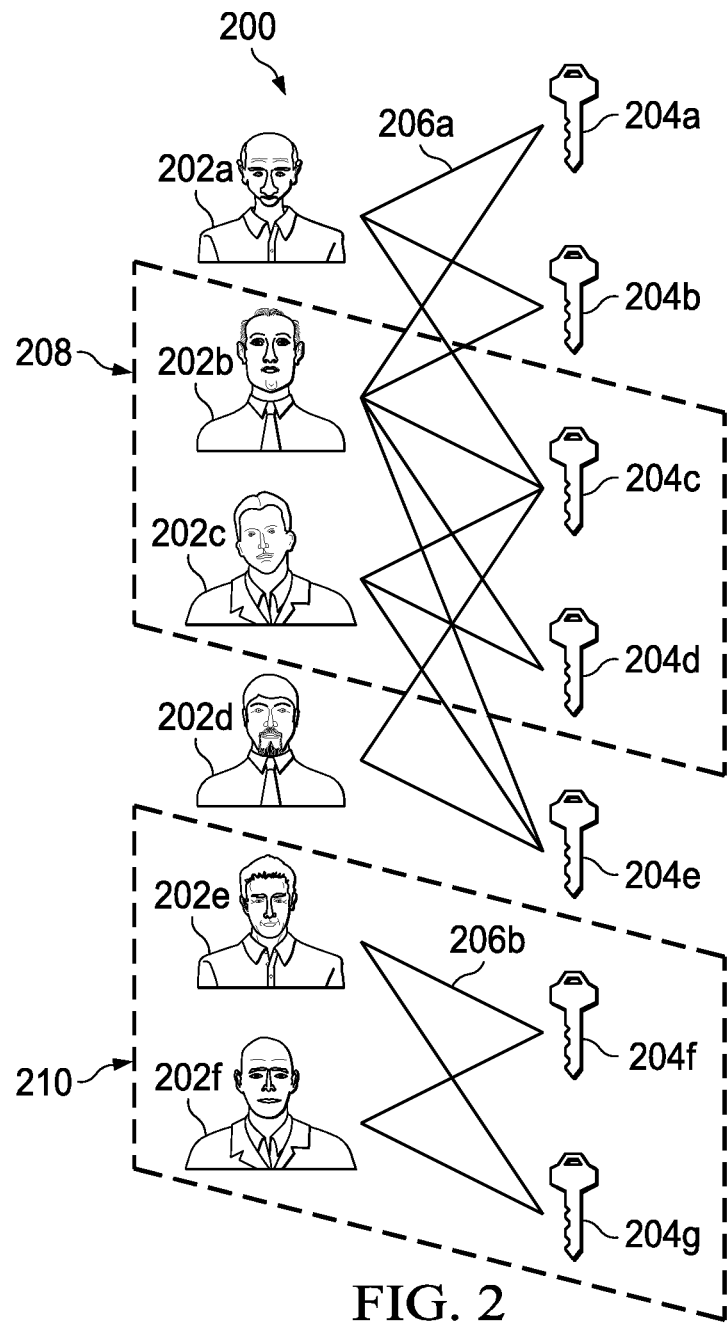
FIG. 2 is a graphical representation illustrating concepts for an embodiment of the invention.

Referring to FIG. 2, there is shown a graph 200 comprising a configuration of user-permission pairs of the type described above, for an associated data processing system. Graph 200 could be derived, for example, from information contained in the ACL of the system. Vertices of the graph include each of the users 202a-f and each of the permissions 204a-g. Edges of the graph comprise each of the connections between a user and a permission, as represented for example in graph 200 by lines 206a and 206b.

It is an objective of embodiments of the invention to efficiently determine what portion of a configuration of users, permissions and the connections therebetween comprises an accurate and useful role for an RBAC structure, as described above. A further objective is to identify anomalous edges, such as user-permissions which are not needed, or which should be revoked. In a useful approach, a set of subgraphs, each comprising a number of candidate roles, is identified in a graph such as graph 200. A subset of these subgraph-candidate roles is then selected, using pre-specified criteria, to be optimal roles which will actually be used in the RBAC structure of the system. The selected number of optimal roles preferably comprises the minimum number of roles needed to cover all or most of the user-permission assignments of the graph, and to thus cover all edges or connections.

Referring further to FIG. 2, there are shown exemplary subgraphs of the type described above. Subgraph 208 includes users 202b-c, permissions 204c-d, and the respective connections thereof. Similarly, subgraph 210 includes users 202e-f, permissions 204f-g and the respective connections therebetween. Subgraphs 208 and 210 may initially be identified as candidate roles. However, subgraph 210 has more exclusive users and permissions than subgraph 208. Accordingly, subgraph 210 is much more likely to be finally selected as an optimal role for RBAC than subgraph 208. Characteristics that make the users and permissions of a subgraph exclusive are described hereinafter in further detail.

Figure 3:
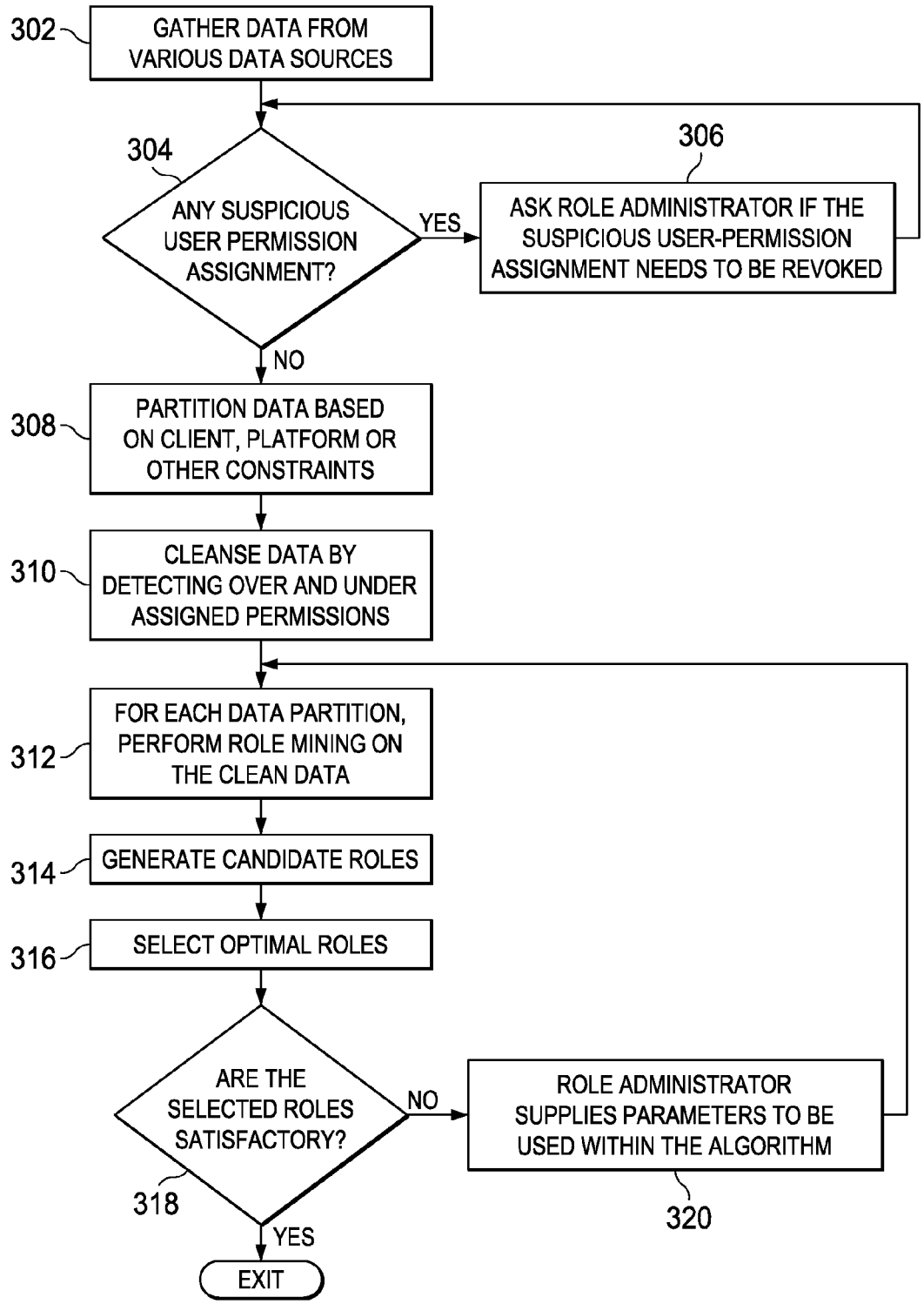
FIG. 3 is a flow chart showing steps for a method comprising an embodiment of the invention.

Referring to FIG. 3, there is shown a number of steps for a method for determining or discovering a role as described above, in accordance with an embodiment of the invention. At step 302, data is gathered in regard to users and user-permission assignments, from a number of data sources. These include both bottom up and top down role discovery sources, such as databases 10 and 14-18 of FIG. 1. Step 304 is a decision step for determining whether any of the user-permission assignments may not be valid, such as by considering user login data or credentials. If a decision at step 304 is affirmative, for a given user-permission assignment, a human role engineer or administrator is queried at step 306, to decide whether the given user-permission assignment should be revoked. If the decision at step 304 is negative, the method proceeds to step 308.

At step 308, received data is partitioned on the basis of certain external constraints to ensure that such constraints are not violated. For example, in the process of creating roles, the data could be partitioned so that all the users in a given role will serve a particular client. In another partitioning, all the users admitted to a role could be associated only with a particular system platform. Generally, a separate set of roles will be created for each partition.

Data is cleansed at step 310, by detecting whether there are any over assigned or under assigned permissions. This task may be carried out by using an algorithm, such as algorithms described hereinafter. At step 312, role mining is performed on the clean data for each partition. This may be done by means of a set of algorithms and parameters, such as exemplary algorithms described hereinafter. Moreover, step 312 is usefully performed in two phases, shown in FIG. 3 as steps 314 and 316. At step 314, a group of possible or candidate roles are identified and generated. From these roles, one or more optimal roles is selected at step 316.

At decision step 318, it is determined whether each of the selected optimal roles is satisfactory. A role is satisfactory only if it is considered to be semantically valid. If each of the selected roles are found to be satisfactory, the method is ended. Otherwise, the method proceeds to step 320.

At step 320, in response to determining that a generated role is not semantically valid, the role administrator supplies one or more different parameters for use within the algorithm at step 312. For example, the role administrator could specify an attribute for users which was different from a previously used user attribute.

In carrying out respective steps of FIG. 3, it is useful to regard each role as a subgraph $\overline{G}$, which comprises user-permission assignments as exemplified in FIG. 2 by subgraphs 208 and 210 of graph 200. For the subgraph $\overline{G}$, $\overline{G}=(\overline{U}, \overline{P}, \overline{E})$, where $\overline{U}$ and $\overline{P}$ are the total users and permissions, respectively, of the subgraph. $\overline{E}$ is the total number of edges or connections that extend from both each user and each permission. One or more of the connections may each extend between a user and a permission that are both included in the subgraph, so that each of such connections lies entirely within the subgraph. The total number of users joined only or exclusively to such connections is referred to herein as $\overline{U}^{ex}$, and the total number of permissions joined exclusively to such connections is referred to herein as $\overline{P}^{ex}$. That is, $\overline{U}^{ex}$ is the total number of users $\overline{U}$ that have all their connections exclusively lying within subgraph $\overline{G}$. Similarly, $\overline{P}^{ex}$ is the total number of permissions $\overline{P}$ that have all their connections exclusively lying within subgraph $\overline{G}$.

From the above definitions, and for a set of variable parameter values $(\epsilon, \delta, \gamma)$ the following relationships are very useful for constructing algorithms to perform respective steps of FIG. 3:

$$|\overline{U}^{ex}| \geq \epsilon |\overline{U}| \qquad \text{Equation (1)}$$

$$\overline{U}^{ex} = \{u \in \overline{U} : |\overline{P}| \geq \delta | N_u\} \qquad \text{Equation (2)}$$

$$|\overline{P}^{ex}| \geq \epsilon |\overline{P}| \qquad \text{Equation (3)}$$

$$\overline{P}^{ex} = \{p \in \overline{P} : |\overline{U}| \geq \delta |N_p|\} \qquad \text{Equation (4)}$$

$$\left| \bigcap_{u \in \overline{U}} | A_u \geq \gamma \right| \qquad \text{Equation (5)}$$

$$|\overline{E}| = |\overline{U}||\overline{P}| \qquad \text{Equation (6)}$$

Equation (1) states the condition that the number of exclusive users $\overline{U}^{ex}$ within subgraph $\overline{G}$, as defined above, cannot be less than a fraction $\epsilon$ of the total number of users $\overline{U}$ in the subgraph.

In Equation (2), each u is a user that is included, or is an element of, the total users $\overline{U}$ of subgraph $\overline{G}$. $N_u$ is the total number of edges or connections that extend from the user u. As illustrated by graph 200 of FIG. 2, users of a subgraph can have multiple connections. For example, user 202c of subgraph 208 is shown to have three connections, and thus has an $N_u$ value of three. In view of these definitions, Equation (2) specifies that $\overline{U}^{ex}$ includes only the users u which have values of $N_u$ such that a fraction $\delta$ of the $N_u$ value will not exceed the total number of permissions $\overline{P}$ in the subgraph. Equations (1) and (2) thus establish a relationship between the number of exclusive users $\overline{U}^{ex}$ in subgraph $\overline{G}$, and the total number of permissions $\overline{P}$ therein. More particularly, Equations (1) and (2) specify that at least a fraction $\epsilon$ of the total users $\overline{U}$ of subgraph $\overline{G}$ can each have more than a fraction $\delta$ of their respective total connections $N_u$ remaining within the subgraph.

In like manner with Equation (1), Equation (3) states the condition that the number of exclusive permissions $\overline{P}^{ex}$ within subgraph $\overline{G}$ cannot be less than a fraction ε of the total number of permissions $\overline{P}$ in the subgraph.

In Equation (4), each p is a permission that is included in the total permissions $\overline{P}$ of subgraph $\overline{G}$. $N_p$ is the total number of connections that extend from the permission p. Accordingly, Equation (4) specifies that $\overline{P}^{ex}$ includes only the permissions p which have values of $N_p$ such that δ of the $N_p$ value will not exceed the total number of users u in the subgraph. Thus, Equations (3) and (4) specify that at least a fraction ε of the total permissions $\overline{P}$ of the subgraph $\overline{G}$ can have more than a fraction δ of their respective total connections $N_p$ remaining within the subgraph.

In a useful embodiment of the invention, Equation (1)-(4) may be used to carry out step 314 of FIG. 3, that is, to generate candidate roles. Applying these equations to successive subgraphs of user-permission assignments, for specified values of ε and δ, only subgraphs found to have values of $\overline{U}^{ex}$ and $\overline{P}^{ex}$ that comply with Equations (1)-(4) will be accepted as candidate roles.

In Equation (5), $A_u$ is a set of user attributes, such as attributes of the types discussed above, which are possessed by user u of the subgraph $\overline{G}$. Equation (5) states that each of the users u of the subgraph must have at least γ attributes that are the same for all of such users. In an embodiment of the invention, Equation (5) could be used in carrying out step 316 of FIG. 3. For example, a given candidate role would be selected to be an optimal role, only if the attributes of all the users associated with the given candidate role were in compliance with Equation (5), for a specified value of γ.

Equation (6) specifies that the number of edges $\overline{E}$ of subgraph $\overline{G}$ is equal to the number of users $\overline{U}$ multiplied by the number of permissions $\overline{P}$ thereof. This situation would occur, of course, if all connections of the subgraph extended only between the users and permissions of subgraph $\overline{G}$. Such situation is illustrated, for example, by subgraph 210 of FIG. 2. Accordingly, compliance with Equation (6) could indicate that a subgraph should be considered as a candidate role, or even be selected as an optimal role. Equation (6) may also be useful in connection with step 310 of FIG. 3, for determining whether there are too many or too few assigned permissions.

Figure 4:
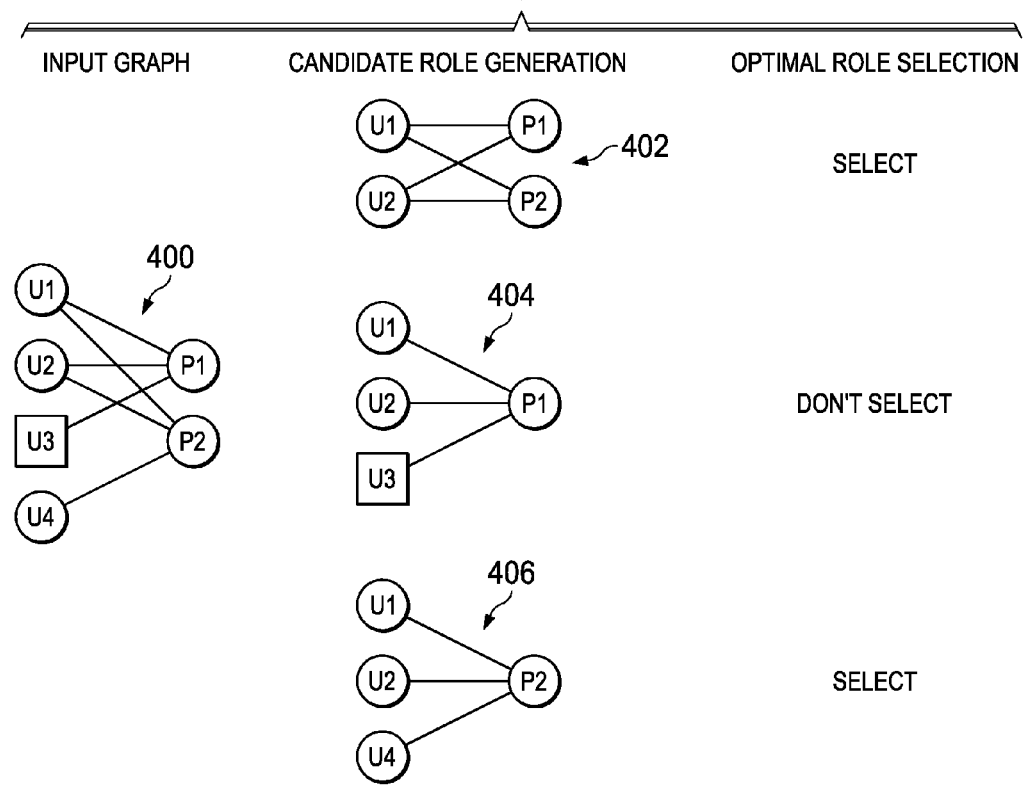
FIG. 4 is a schematic diagram which further illustrates certain steps of the embodiment of FIG. 3.

Referring to FIG. 4, there is shown a schematic diagram that further illustrates role selection steps 314 and 316 of FIG. 3. FIG. 4 depicts a simplified input graph 400, comprising users U1-U4 and permissions P1 and P2. Users U1, U2 and U3 are each connected to permission P1, and users U1, U2 and U4 are each connected to permission P2. Users U1, U2 and U4 all have the same set of attributes, comprising γ specified attributes. User U3, however, does not have all the attributes of the set. User U3 is given a shape (square) that is different from the shape of the other users (circular) to emphasize this difference.

Referring further to FIG. 4, there are shown several candidate roles generated from graph 400, in accordance with step 316 of FIG. 3. These include candidate role 402, comprising users U1 and U2. The roles further include candidate role 404 wherein users U1, U2 and U3 are all connected to permission P1, and candidate role 406, wherein users U1, U2 and U4 are all connected to permission P2.

In a final selection of optimal roles, in accordance with step 314 of FIG. 3, it is determined to select role 402. In this role, each user is connected to each permission. Also, all connections extending from each of the users and permissions remain within the subgraph which comprises role 402.

In regard to role 406, users U1, U2 and U4 are all connected to the same permission P2. Also, all of these users have the same set of attributes, as described above. Accordingly, role 406 is selected to be an optimal role.

In role 404, users U1, U2 and U3 are all connected to permission P1. However, while users U1 and U2 have the set of attributes described above, U3 does not. Role 404 is therefore not selected to be an optimal role.

Figure 5:
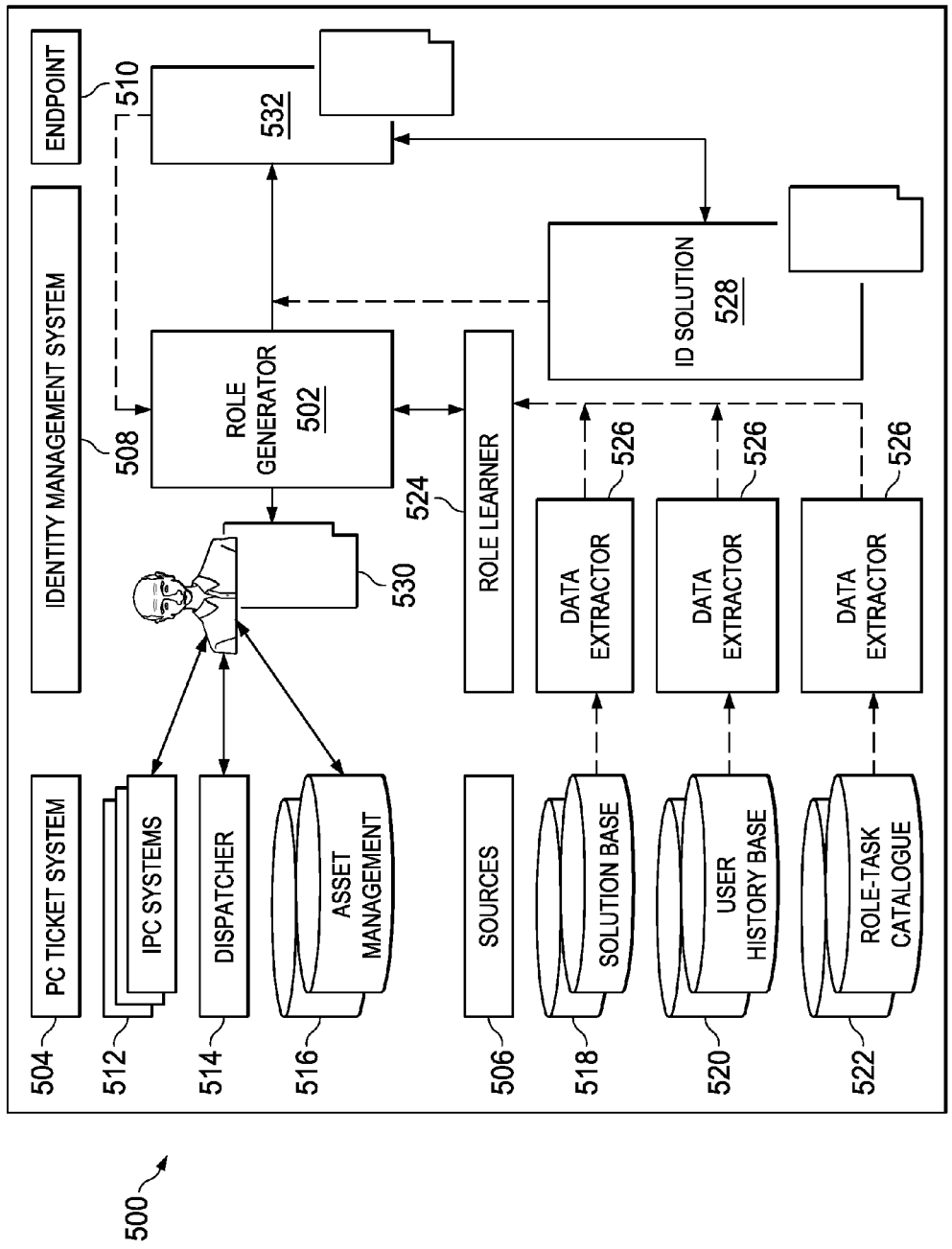
FIG. 5 is a schematic diagram showing elements of a system for generating user roles for a further embodiment of the invention.

Referring to FIG. 5, there is shown a schematic diagram of a system 500, which includes a role generator 502 for providing roles of the type described above. Role generator 502 is connected to a user work station 530. System 500 further includes a catalog for storing previously used roles, and is able to create and update roles as described hereinafter in further detail. Roles provided by system 500 may thus be used in embodiments of the invention, such as for a source of bottom up role discovery information as described in connection with FIG. 1.

System 500 is more specifically configured to generate a recommended set of user access roles that are required to complete a problem resolution process, wherein the problem resolution process comprises a set of specific actions. The roles are furnished in response to an incoming support request, such as a request from an issue tracking system or the like. Commonly, a ticket used by an issue tracking system contains information about problem resolution, and more particularly contains a set of specific action steps or work items for resolving the problem. Moreover, the action steps or work items may require permissions and roles, of the types described above, in order to perform the action steps.

Accordingly, system 500 is adapted to track existing tickets and solutions described therein, in order acquire information for use in providing role recommendations. Such information is placed into the catalog described above, wherein action steps or work items of a solution are usefully matched to the roles which are needed to perform the action steps. System 500 also continuously monitors the problem resolution process, and detects any additional role requirements from the standard set of actions, in order to update the roles for specific action items. All of such updates are stored in the role catalog. As a result, the system can dynamically, at run time, recommend supplementary roles. The catalog usefully maintains hierarchies of respective roles and associated tasks. Operation of system 500 is described hereinafter, in connection with FIGS. 6A-6B.

Referring further to FIG. 5, it is seen that system 500 comprises four principal components, which are interconnected with role generator 502 and work station 530. These include PC Ticket System 504; Sources 506; an Identity Management System 508; and an Endpoint 510. PC Ticket System 504 is associated with an issue tracking system, and may provide an incoming support ticket as an input and thereby help identify task types for which privileges need to be created. PC Ticket System 504 comprises a set of IPC systems 512, a dispatcher 514 and an asset management element 516.

FIG. 5 further shows Sources 506 comprising a solution base 518, a user history base 520, and a role-task catalog 522. A role learner 524, associated with role generator 502, can access data from each of the Sources 506 by means of a data extractor 526.

Identity Management System 508 includes an identity solution component 528. Identity Management System 508 tracks user activity such as logins and executions, and also tracks associated roles to monitor tasks and required roles. Endpoint 510 has a component 532, and handles exceptions by feeding unknown roles to the learning system.

Figure 6A:
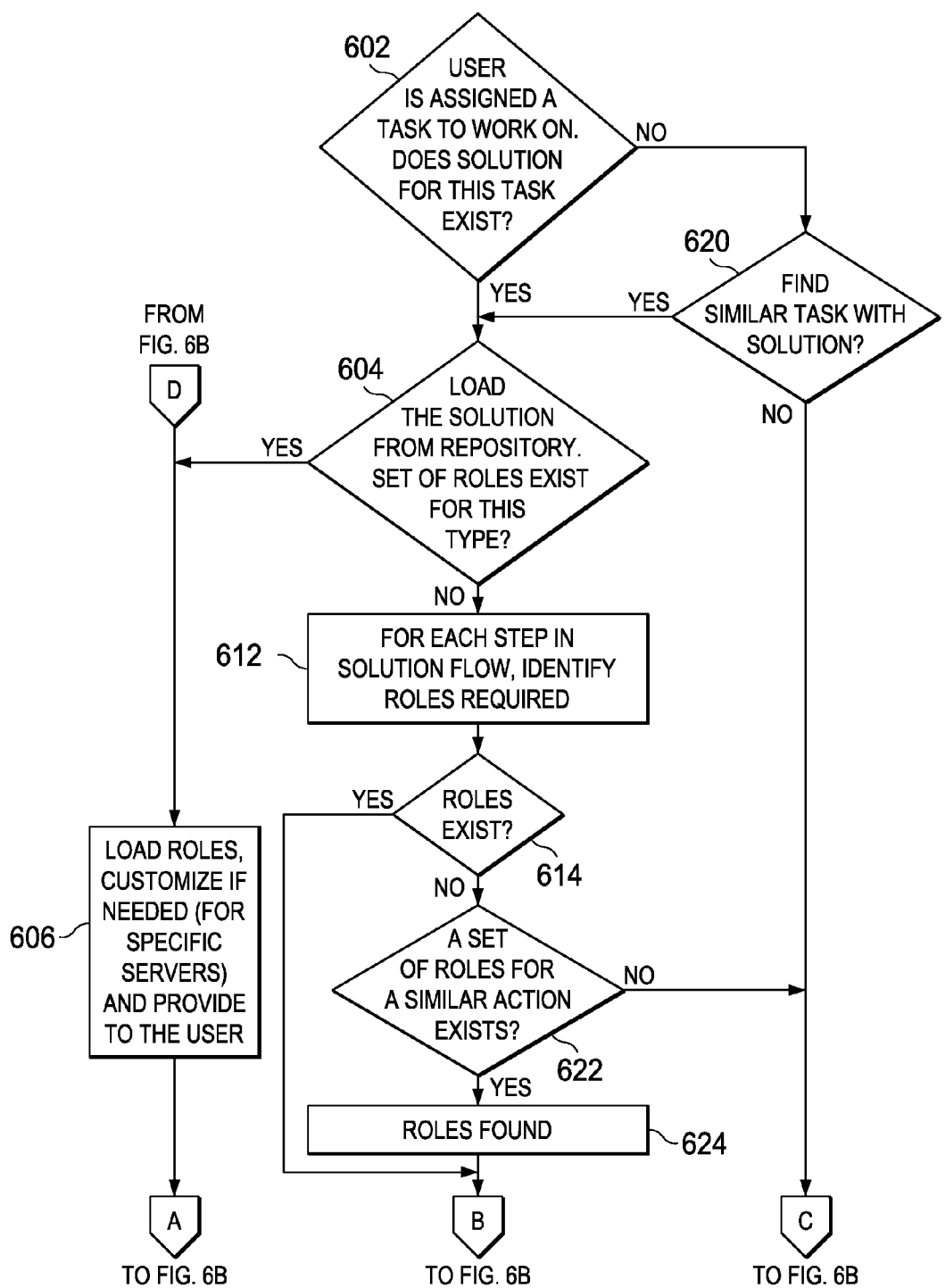
FIGS. 6A-6B are a flow chart depicting operation of the system of FIG. 5.
Figure 6B:
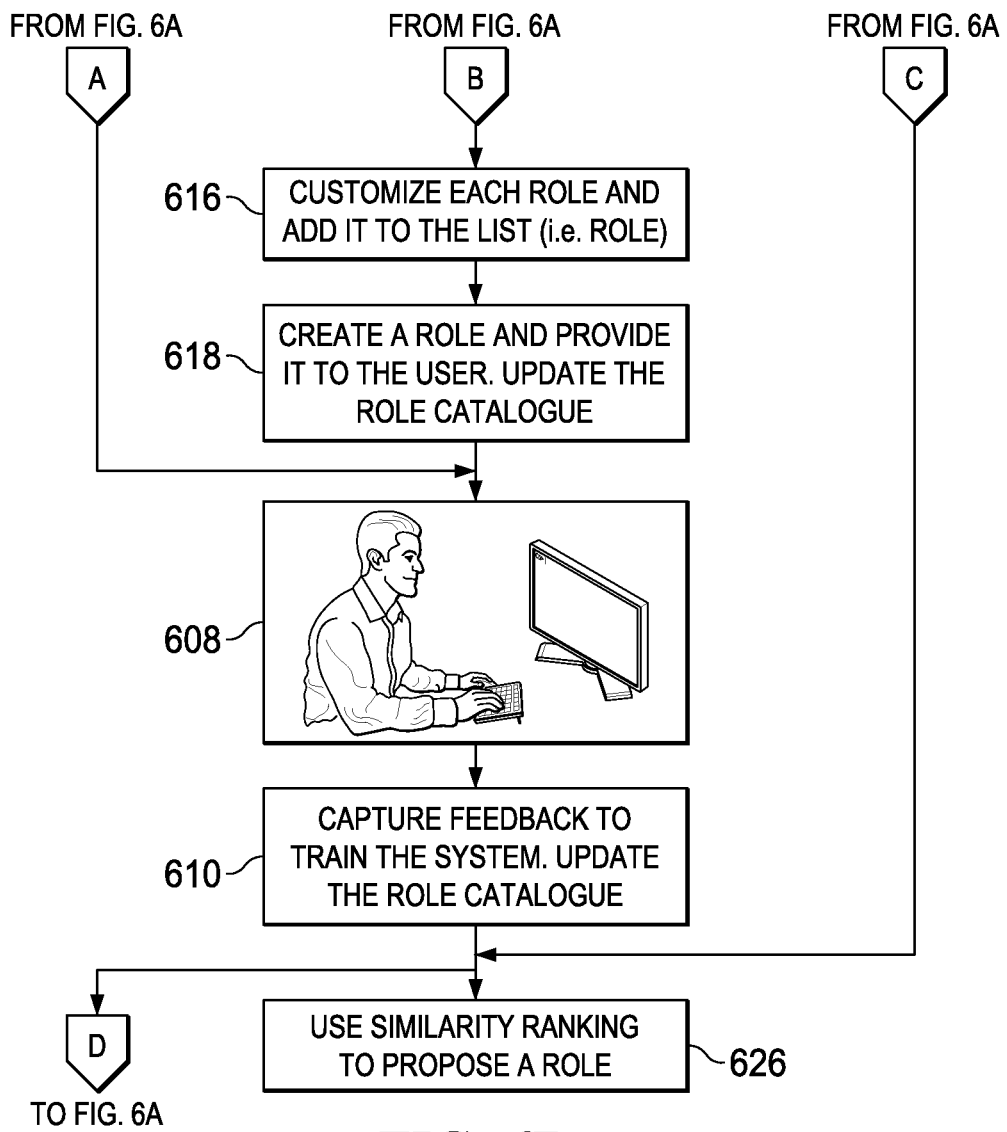

Referring to FIGS. 6A-6B, there is shown a flow chart depicting a number of steps, which are selectively performed for different modes of operation of system 500. Operation commences at step 602, when a user of system 500 is assigned a task to work on, for which one or more roles are required. For example, a support request may be received that specifies a problem for which a solution must be found, wherein the solution will typically comprise a set or series of action steps or items.

In response to the task assignment, it must be determined at step 602 whether or not a solution for the task exists. To make this determination, system 500 is operated to query its solution base 518. If a solution for the task is found, the solution is loaded at step 604. Step 604 then determines whether or not a set of roles already exists for the type of solution that was loaded. To determine this, system 500 queries its task-catalog 522.

If it is determined that a set of roles does in fact exist, such roles are loaded at step 606, and are customized for specific servers if necessary. The roles are then provided to a user, such as at a work station 608. FIGS. 6A-6B show the roles delivered to step 606 from step 610, which is associated with the role catalog.

Returning to step 604, if it is determined at such step that a set of roles for the solution is not available, system 500 is operated at step 612 to consider each action step or action item in the solution flow. The roles required for such action step are also identified. It is then determined, at step 614, whether a role is available for each action step. Again, role-task catalog 522 can be queried for this purpose. If suitable roles are found to exist at step 614, each such role is customized at step 616, and provided to the user at 618. The role catalog is also updated with these roles at step 618.

If it is determined at step 602 that a solution does not exist for the initially assigned task, system 500 at step 620 seeks to find a similar task that does have a solution. Solution base 518 of system 500 can be queried for this purpose. If such similar task is found at step 620, operation of system 500 proceeds to step 604, and continues from there as described herein.

Returning to step 614, if it is decided that roles do not exist for each action step of the solution processed at step 612, system 500 searches at step 622 for a set of roles that have been used for action steps that are respectively similar to the action steps of step 612. Once again, Sources 506 of FIG. 5 can be used for this purpose. If such roles or similar action steps are found, step 624 shows that the roles are customized at step 616, and then provided to the user at work station 608.

On the other hand, if roles for similar action steps are not found to exist at step 622, step 626 shows that a similarity ranking is used to propose suitable roles.

Returning to step 620, if a task which is similar to the assigned task and has a solution is not found, operation of system 500 proceeds to step 626. Again, similarity ranking is used to propose necessary roles. While not explicitly shown in FIGS. 6A-6B, the roles of step 626 could be provided to the user at work station 608.

Referring further to FIGS. 6A-6B, step 610 shows that all new role information generated at respective steps of FIGS. 6A-6B is used to update the role-task catalog of system 500.

Figure 7:
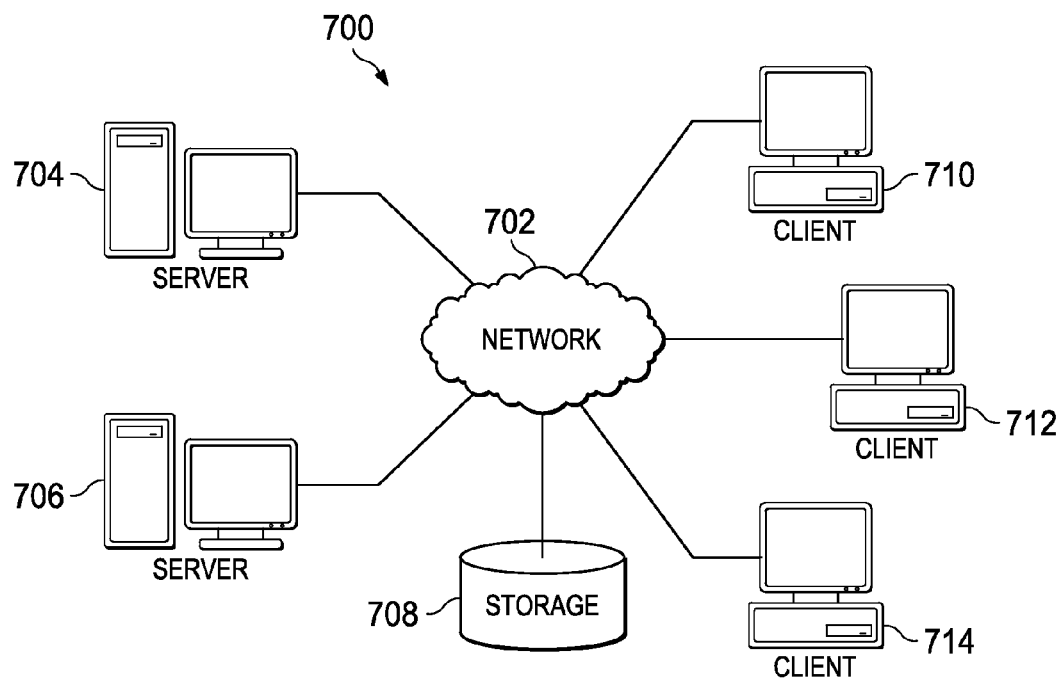
FIG. 7 is a pictorial representation of a network of data processing systems in which illustrative embodiments may be implemented.

FIG. 7 depicts a pictorial representation of a network of data processing systems in which illustrative embodiments may be implemented. Network data processing system 700 is a network of computers in which the illustrative embodiments may be implemented. Network data processing system 700 contains network 702, which is the medium used to provide communication links between various devices and computers connected together within network data processing system 700. Network 702 may include connections, such as wire, wireless communication links, or fiber optic cables.

In the depicted example, server 704 and server 706 connect to network 702 along with storage unit 708. In addition, clients 710, 712, and 714 connect to network 702. Clients 710, 712, and 714 may be, for example, personal computers or network computers. In the depicted example, server 704 provides information, such as boot files, operating system images, and applications to clients 710, 712, and 714. Clients 710, 712, and 714 are clients to server 704 in this example. Network data processing system 700 may include additional servers, clients, and other devices not shown.

Program code located in network data processing system 700 may be stored on a computer recordable storage medium and downloaded to a data processing system or other device for use. For example, program code may be stored on a computer recordable storage medium on server 704 and downloaded to client 710 over network 702 for use on client 710.

In the depicted example, network data processing system 700 is the Internet with network 702 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 700 also may be implemented as a number of different types of networks, such as for example, an intranet, a local area network (LAN), or a wide area network (WAN). FIG. 7 is intended as an example, and not as an architectural limitation for the different illustrative embodiments.

Figure 8:
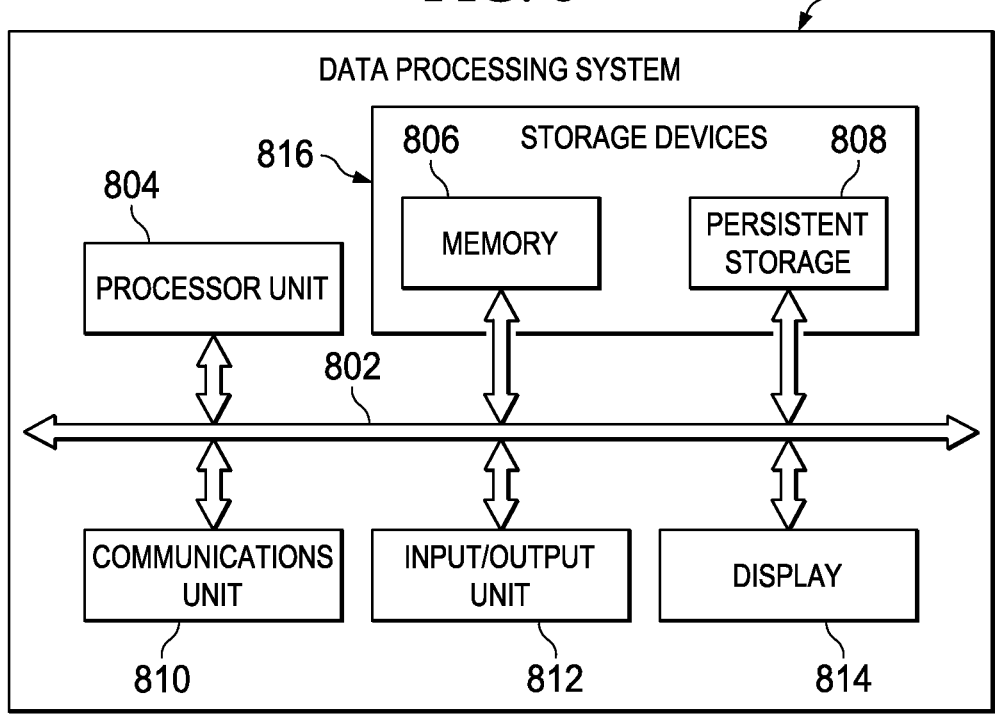
FIG. 8 is a block diagram showing a data processing system that may be used in implementing embodiments of the invention.
Figure 8:
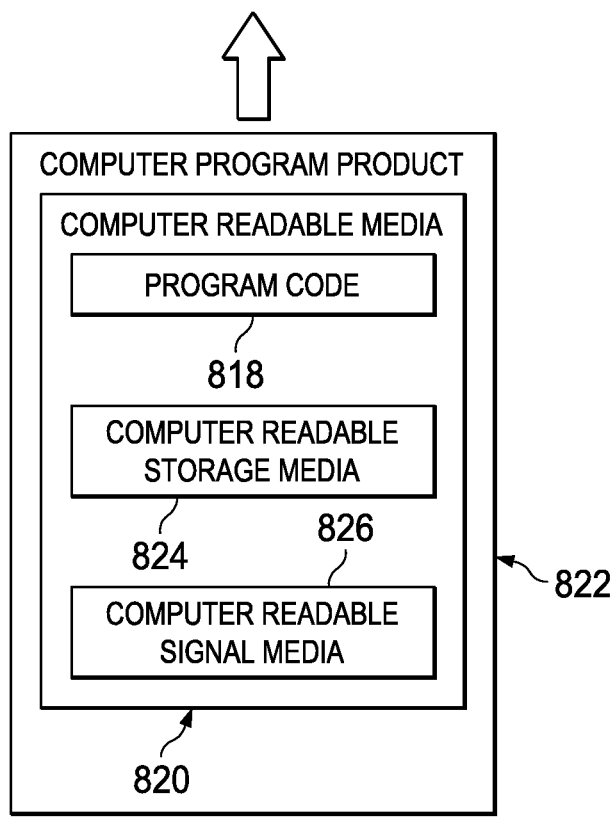

FIG. 8 depicts a diagram of a data processing system in accordance with an illustrative embodiment. Data processing system 800 is an example of a computer, such as server 704 or client 710 in FIG. 7, in which computer usable program code or instructions implementing the processes may be located for the illustrative embodiments. In this illustrative example, data processing system 800 includes communications fabric 802, which provides communications between processor unit 804, memory 806, persistent storage 808, communications unit 810, input/output (I/O) unit 812, and display 814.

Processor unit 804 serves to execute instructions for software that may be loaded into memory 806. Processor unit 804 may be a set of one or more processors or may be a multi-processor core, depending on the particular implementation. Further, processor unit 804 may be implemented using one or more heterogeneous processor systems, in which a main processor is present with secondary processors on a single chip. As another illustrative example, processor unit 804 may be a symmetric multi-processor system containing multiple processors of the same type.

Memory 806 and persistent storage 808 are examples of storage devices 816. A storage device is any piece of hardware that is capable of storing information, such as, for example, without limitation, data, program code in functional form, and/or other suitable information either on a temporary basis and/or a permanent basis. Memory 806, in these examples, may be, for example, a random access memory, or any other suitable volatile or non-volatile storage device. Persistent storage 808 may take various forms, depending on the particular implementation. For example, persistent storage 808 may contain one or more components or devices. For example, persistent storage 808 may be a hard drive, a flash memory, a rewritable optical disk, a rewritable magnetic tape, or some combination of the above. The media used by persistent storage 808 may be removable. For example, a removable hard drive may be used for persistent storage 808.

Communications unit 810, in these examples, provides for communication with other data processing systems or devices. In these examples, communications unit 810 is a network interface card. Communications unit 810 may provide communications through the use of either or both physical and wireless communications links.

Input/output unit 812 allows for the input and output of data with other devices that may be connected to data processing system 800. For example, input/output unit 812 may provide a connection for user input through a keyboard, a mouse, and/or some other suitable input device. Further, input/output unit 812 may send output to a printer. Display 814 provides a mechanism to display information to a user.

Instructions for the operating system, applications, and/or programs may be located in storage devices 816, which are in communication with processor unit 804 through communications fabric 802. In these illustrative examples, the instructions are in a functional form on persistent storage 808. These instructions may be loaded into memory 806 for execution by processor unit 804. The processes of the different embodiments may be performed by processor unit 804 using computer implemented instructions, which may be located in a memory, such as memory 806.

These instructions are referred to as program code, computer usable program code, or computer readable program code that may be read and executed by a processor in processor unit 804. The program code, in the different embodiments, may be embodied on different physical or computer readable storage media, such as memory 806 or persistent storage 808.

Program code 818 is located in a functional form on computer readable media 820 that is selectively removable and may be loaded onto or transferred to data processing system 800 for execution by processor unit 804. Program code 818 and computer readable media 820 form computer program product 822. In one example, computer readable media 820 may be computer readable storage media 824 or computer readable signal media 826. Computer readable storage media 824 may include, for example, an optical or magnetic disc that is inserted or placed into a drive or other device that is part of persistent storage 808 for transfer onto a storage device, such as a hard drive, that is part of persistent storage 808. Computer readable storage media 824 also may take the form of a persistent storage, such as a hard drive, a thumb drive, or a flash memory that is connected to data processing system 800. In some instances, computer readable storage media 824 may not be removable from data processing system 800.

Alternatively, program code 818 may be transferred to data processing system 800 using computer readable signal media 826. Computer readable signal media 826 may be, for example, a propagated data signal containing program code 818. For example, computer readable signal media 826 may be an electro-magnetic signal, an optical signal, and/or any other suitable type of signal. These signals may be transmitted over communications links, such as wireless communication links, an optical fiber cable, a coaxial cable, a wire, and/or any other suitable type of communications link. In other words, the communications link and/or the connection may be physical or wireless in the illustrative examples. The computer readable media also may take the form of non-tangible media, such as communications links or wireless transmissions containing the program code.

In some illustrative embodiments, program code 818 may be downloaded over a network to persistent storage 808 from another device or data processing system through computer readable signal media 826 for use within data processing system 800. For instance, program code stored in a computer readable storage media in a server data processing system may be downloaded over a network from the server to data processing system 800. The data processing system providing program code 818 may be a server computer, a client computer, or some other device capable of storing and transmitting program code 818.

The different components illustrated for data processing system 800 are not meant to provide architectural limitations to the manner in which different embodiments may be implemented. The different illustrative embodiments may be implemented in a data processing system including components in addition to or in place of those illustrated for data processing system 800. Other components shown in FIG. 8 can be varied from the illustrative examples shown. The different embodiments may be implemented using any hardware device or system capable of executing program code. As one example, data processing system 800 may include organic components integrated with inorganic components and/or may be comprised entirely of organic components excluding a human being. For example, a storage device may be comprised of an organic semiconductor.

As another example, a storage device in data processing system 800 is any hardware apparatus that may store data. Memory 806, persistent storage 808, and computer readable media 820 are examples of storage devices in a tangible form.

In another example, a bus system may be used to implement communications fabric 802 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 806 or a cache such as found in an interface and memory controller hub that may be present in communications fabric 802.

The flowchart and block diagrams in the figures illustrate the architecture, functionality, and operation of possible implementations of systems, methods and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the illustrative embodiments has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. In a data processing system associated with a plurality of users, wherein at least a portion of the users have each been previously assigned one or more permissions which correspond respectively to specified system resources, a method comprising:
   acquiring, by the data processing system, data from a first data source, wherein said first data source contains information pertaining to the users of said portion and to the permissions previously assigned thereto;
   acquiring, by the data processing system, data from a second data source, wherein said second data source contains information pertaining to one or more specified attributes of each user of said plurality;
   determining, by the data processing system, a set of permissions for a given role, wherein said set of permissions are determined using information from at least one of said first data source and said second data source, and said set of permissions comprises one or more specified permissions associated with resources of said system;
   determining, by the data processing system, a first criterion for assigning users to said given role from information contained in said first data source;
   determining, by the data processing system, a second criterion for assigning users to said given role from information contained in said second data source;
   selecting, by the data processing system, a particular user for admission to said given role only if said particular user is in compliance with both said first criterion and said second criterion, wherein each user admitted to said given role is assigned each of the specified permissions of said permission set;
   assigning, by the data processing system, a task to the particular user to resolve a problem associated with the data processing system;
   responsive to the data processing system determining that a solution to the task for resolving the problem does not exist in a repository, finding, by the data processing system, a similar task with a solution;
   identifying, by the data processing system, a required role for each action step in a set of action steps associated with the similar task;
   responsive to the data processing system determining that a required role for a particular action step in the set of action steps associated with the similar task does not exist, determining, by the data processing system, whether a role exists for a similar action step; and
   responsive to the data processing system determining that a role does not exist for the similar action step, using, by the data processing system, a similarity ranking to propose a suitable role.

2. The method of claim 1, wherein:
   information from said first data source is used to construct a graph, said graph including said users of said portion, the permissions previously assigned thereto, and each connection between said users and permissions, wherein a two phase procedure is applied to said graph, in order to determine said set of permissions, said first criterion and said second criterion for said given role.

3. The method of claim 2, wherein:
   said two phase procedure comprises identifying one or more subgraphs of said graph to be candidate roles, and then selecting one or more of the candidate roles to be optimal roles, which are to be used with said data processing system.

4. The method of claim 3, wherein:
   said two phase procedure includes making decisions based on both a number of exclusive users and a number of exclusive permissions in each of said one or more subgraphs of said graph.

5. The method of claim 2, wherein:
   said two phase procedure uses information acquired from said second data source, as well as from said first data source.

6. The method of claim 3, wherein:
   data associated with said graph is partitioned based on a specified client ensuring that a specified group of users are all directed to a role that serves the specified client.

7. The method of claim 2, wherein:
   said two phase procedure uses a set of algorithms that include one or more selectively adjustable parameters.

8. The method of claim 1, further comprising:
   determining, by the data processing system, whether any permission, disclosed by information contained in said first data source, is either over assigned or underassigned.

9. The method of claim 1, wherein:
   at least some of the information contained in said first data source is acquired from an Access Control List associated with said data processing system.

10. The method of claim 1, wherein:
    information contained in said second data source includes at least one attribute of each user of said plurality, wherein said attribute is selected from a group of attributes that include at least position, function, skill set and geographic location of respective users.

11. The method of claim 2, wherein:
    said first data source contains information from a role-task catalog, wherein an entry in the role-task catalog includes a problem solution that is associated with said data processing system, the problem solution comprises a set of action steps, and the entry comprises a listing of each action step, matched together with a role that is needed by system users to perform an action step.

12. The method of claim 11, wherein:
    said entry in the role-task catalog is selectively updated, when an additional role requirement is detected, in relation to said set of action steps.

13. A computer program product executable in a computer readable storage device in a data processing system associated with a plurality of users, wherein at least a portion of the users have each been previously assigned one or more permissions which correspond respectively to specified system resources, said computer program product comprising:

instructions for acquiring data from a first data source, wherein said first data source contains information pertaining to the users of said portion and to the permissions previously assigned thereto;
instructions for acquiring data from a second data source, wherein said second data source contains information pertaining to one or more specified attributes of each user of said plurality;
instructions for determining a set of permissions for a given role, wherein said set of permissions are determined using information from at least one of said first data source and said second data source, and said set of permissions comprises one or more specified permissions associated with resources of said system;
instructions for determining a first criterion for assigning users to said given role from information contained in said first data source;
instructions for determining a second criterion for assigning users to said given role from information contained in said second data source;
instructions for selecting a particular user for admission to said given role only if said particular user is in compliance with both said first criterion and said second criterion, wherein each user admitted to said given role is assigned each of the specified permissions of said permission set;
instructions for assigning a task to the particular user to resolve a problem associated with the data processing system;
instructions, responsive to determining that a solution to the task for resolving the problem does not exist in a repository, for finding a similar task with a solution;
instructions for identifying a required role for each action step in a set of action steps associated with the similar task;
instructions, responsive to determining that a required role for a particular action step in the set of action steps associated with the similar task does not exist, for determining whether a role exists for a similar action step; and
instructions, responsive to determining that a role does not exist for the similar action step, for using a similarity ranking to propose a suitable role.

14. The computer program product of claim 13, wherein:
information from said first data source is used to construct a graph, said graph including said users of said portion, the permissions previously assigned thereto, and each connection between said users and permissions, wherein a two phase procedure is applied to said graph, in order to determine said set of permissions, said first criterion and said second criterion for said given role.

15. The computer program product of claim 14, wherein:
said two phase procedure comprises identifying one or more subgraphs of said graph to be candidate roles, and then selecting one or more of the candidate roles to be optimal roles, which are to be used with said data processing system.

16. The computer program product of claim 15, wherein:
said two phase procedure includes making decisions based on both a number of exclusive users and a number of exclusive permissions in each of said one or more subgraphs of said graph.

17. Apparatus for a data processing system associated with a plurality of users, wherein at least a portion of the users have each been previously assigned one or more permissions which correspond respectively to specified system resources, said apparatus comprising:

processing means for acquiring data from a first data source, wherein said first data source contains information pertaining to the users of said portion and to the permissions previously assigned thereto;
processing means for acquiring data from a second data source, wherein said second data source contains information pertaining to one or more specified attributes of each user of said plurality;
processing means for determining a set of permissions for a given role, wherein said set of permissions are determined using information from at least one of said first data source and said second data source, and said set of permissions comprises one or more specified permissions associated with resources of said system;
processing means for determining a first criterion for assigning users to said given role from information contained in said first data source;
processing means for determining a second criterion for assigning users to said given role from information contained in said second data source;
processing means for selecting a particular user for admission to said given role only if said particular user is in compliance with both said first criterion and said second criterion, wherein each user admitted to said given role is assigned each of the specified permissions of said permission set;
processing means for assigning a task to the particular user to resolve a problem associated with the data processing system;
processing means, responsive to determining that a solution to the task for resolving the problem does not exist in a repository, for finding a similar task with a solution;
processing means for identifying a required role for each action step in a set of action steps associated with the similar task;
processing means, responsive to determining that a required role for a particular action step in the set of action steps associated with the similar task does not exist, for determining whether a role exists for a similar action step; and
processing means, responsive to determining that a role does not exist for the similar action step, for using a similarity ranking to propose a suitable role.

18. The apparatus of claim 17, wherein:
information from said first data source is used to construct a graph, said graph including said users of said portion, the permissions previously assigned thereto, and each connection between said users and permissions, wherein a two phase procedure is applied to said graph, in order to determine said set of permissions, said first criterion and said second criterion for said given role.

19. The apparatus of claim 18, wherein:
said two phase procedure comprises identifying one or more subgraphs of said graph to be candidate roles, and then selecting one or more of the candidate roles to be optimal roles, which are to be used with said data processing system.

20. The apparatus of claim 19, wherein:
said two phase procedure includes making decisions based on both a number of exclusive users and a number of exclusive permissions in each of said one or more subgraphs of said graph.

* * * * *